United States Patent [19]
Vallauri et al.

[11] Patent Number: 5,087,492
[45] Date of Patent: Feb. 11, 1992

[54] EXPANDED ELASTIC SLEEVE WITH WOUND INTERNAL SUPPORT FOR ELECTRIC CABLE JOINTS AND SEALING ENDS

[75] Inventors: Ubaldo Vallauri, Monza; Francesco Portas, Quattordio, both of Italy

[73] Assignee: Societa' Cavi Pirelli S.p.A., Milan, Italy

[21] Appl. No.: 527,517

[22] Filed: May 23, 1990

[30] Foreign Application Priority Data

May 24, 1989 [IT] Italy ............................... 20620 A/89

[51] Int. Cl.⁵ .......................... F16L 11/00; H01B 7/00
[52] U.S. Cl. ................... 428/34.9; 428/906; 428/35.8; 174/DIG. 8; 174/73.1
[58] Field of Search ............... 428/34.9, 35.8, 906; 174/DIG. 8, 73 R, 135, 80, 19

[56] References Cited

U.S. PATENT DOCUMENTS

| | | | |
|---|---|---|---|
| 4,389,440 | 6/1983 | Keith | 428/36 |
| 4,503,105 | 3/1985 | Tomioka | 428/36 |
| 4,671,028 | 8/1987 | Figone | 52/108 |

*Primary Examiner*—James J. Seidleck
*Assistant Examiner*—Charles R. Nold
*Attorney, Agent, or Firm*—Brooks Haidt Haffner & Delahunty

[57] ABSTRACT

A stretched, elastic sleeve for enclosing a joint between a pair of interconnected electric cables, or an end of such a cable, is mounted on a tubular supporting body formed by a helically wound tape with contiguous turns. The tape has transversely extending notches to improve the bendability of the tape. After the assembly of the sleeve and the body is disposed around the joint or cable end, the tape is pulled out of the sleeve permitting the sleeve to contract and engage the cable.

23 Claims, 3 Drawing Sheets

EXPANDED ELASTIC SLEEVE WITH WOUND INTERNAL SUPPORT FOR ELECTRIC CABLE JOINTS AND SEALING ENDS

BACKGROUND OF THE INVENTION

The present invention relates to an assembly comprising a supporting tubular body and an elastically expanded sleeve fitted thereon and in particular, to sleeves of such type for electric cable joints and sealing ends.

Although the invention will be described in connection with covering sleeves for electric cable joints and to the associated supporting tubular bodies, it is to be understood that the covering sleeves of the invention can be applied to any whatsoever cylindrical body, such as, for example, tubes, bars, stems and the like, on which an elastically expanded and collapsible covering sleeve is to be applied, for example, for the local protection from the corrosion. Moreover, although the description of the present invention makes a detailed reference to the electric cable joints, it is to be understood that the invention can be applied similarly on the ends of the cables themselves, and moreover, can also be applied at any point on any cylindrical body, independently of the presence of joints or discontinuities in its structure.

In order to provide joints between electric cables, the conductors of the cables to be interconnected are locally stripped of the insulation surrounding them, and the space corresponding to the removed insulation is then filled with suitable means. Thereafter, a sleeve of one or more layers is disposed around the connecting zone.

Said sleeve, the characteristics of which are well known in the art, must be fitted on one of the cables, before their connection, and then slid on the joined cables until it is in the correct position on the joint. Subsequently, the sleeve must be able to tightly engage the surfaces of the cable insulations.

To this end, the sleeve is supported in radially and elastically expanded condition by a sufficiently rigid tubular element which has an inner diameter greater than the outer diameter of the cables and which can slide freely on them. At the desired time, the tubular supporting element can be then removed so that the sleeve contracts elastically and tightens on the cables as desired.

The radially inward pressure corresponding to the radial expansion of the sleeve is considerable since the sleeves can be expanded up to 200-300%. In particular, if it is desired to use a single sleeve for more than one cable outer diameter, the sleeve itself must be subject to a particularly greater expansion than would be necessary if the sleeve were designed for only one cable diameter.

Sleeves of this type are, for example, described in U.S. application Ser. No. 07/464,370 filed Jan. 12, 1990 of the assignee of the present application.

There are known tubular elements for supporting sleeves which can be removed, allowing the sleeve contraction, by means of an axial unthreading as described in the European Patent No. 149 032 of the assignee of the present application. Said tubular elements easily withstand the pressure applied thereto by the sleeve, but they must be unthreaded by means of suitable tools because of the high friction between the outer surface of the supporting element and the inner surface of the sleeve. Accordingly, their use is laborious.

Supporting tubular elements are also known from the English Patent No. 1 292 608, and such elements are formed by a tape, or the like, wound as a helix having contiguous turns. Said tubular element can be removed by unwinding the helix through a pulling action exerted on one end of the tape which has been previously unwound at one extremity of the tubular body, introduced into it and pulled at the opposite extremity. In said manner, the tubular element so formed is eliminated with the least effort from the inside of the sleeve and the relative operations can be carried out manually without particular tools.

However, the known wound structure is suitable only for supporting sleeves of small thickness or not greatly expanded since the known wound tapes must have a relatively small thickness which means that the tubular bodies have a thin wall, i.e. not sufficient to bear the inward pressure imposed by the greatly expanded sleeves previously described.

In fact, the use in the known wound structure of tapes having a greater thickness, corresponding to the required resistance, is not possible because said tapes would be to rigid for being bent sufficiently to be introduced into the base of the tubular supporting element, in the space available for them between cables and the tubular element itself, in order to provide the unwinding described above.

The main object of the present invention is to provide an assembly of the above-indicated type comprising a sleeve on a supporting tubular body which is formed by a tape wound as a helix and which is sufficiently flexible to be removed by means of an easy manual pulling action at one end of the tape but which has, at the same time, a structure having a size with the thicknesses necessary to bear the stresses caused by its use with sleeves of large thickness and subjected to substantial radial expansions and thereby exerting corresponding forces of elastic contraction.

BRIEF SUMMARY OF THE INVENTION

In accordance with the present invention, the assembly comprises a supporting tubular body and a covering sleeve, particularly intended for use for joints and sealing ends of electric cables, which is fitted on the tubular body in radially expanded conditions. The tubular body is constituted by a tape wound helically and having contiguous turns and is intended to be removed by undoing the winding by pulling one end of the tape element which is unwound at one extremity of the tubular body and extends inside the body itself as far as the outlet of the body at its opposite extremity causing thus the elastic contraction of the sleeve and its tightening on both the cable ends connected to each other and coaxially arranged inside the sleeve itself. The tape is characterized by the fact that it is provided, along its whole longitudinal extension, with substantially transverse notches, regularly spaced, the walls of said notches being in tight contact with one another in the wound position of the tape and being separable during the unwinding.

According to a preferred embodiment, the notches are positioned on the side of the tape lying, after its helical winding, on one flank of the formed turns facing toward the part of the body opposite to the extremity of the tubular body from which the end of the tape extends.

In an alternative, there are notches alternately arranged on both sides of the tape corresponding to the flanks of the turns formed by it in consequence of its helical winding, it being possible to select, at will, the extremity of the tubular body from which the end of the tape, introduced at the opposite extremity of the body itself, extends.

The notches have such a depth that the residual thickness of the tape at the bottom of the notches is greater than that sufficient for bearing the undoing pull applied to the helical winding.

The sides of the tape which contact, when wound in turns, have flanks on the contiguous turns which are shaped according to complementary surfaces.

Said complementary surfaces are shaped in such a manner that at least one part of the side of the tape provided with notches is outside a corresponding part of the opposite side without notches. According to a particular embodiment, the complementary surfaces are respectively convex and concave.

In a different embodiment of the invention, the notches are provided on the side of the tape forming, after the helical winding, the inner surface of the tubular element. In said embodiment, the notches of the tape can have a profile shaped substantially as a V, open towards the surface in which the notches have been made, with the opening angle between the walls of the notch of a size smaller than that corresponding to the contact between the walls themselves with the tape helically wound.

In each one of the described embodiments, the pitch between two consecutive notches obtained on the same surface of the tape is less than eight notches for each turn. Preferably, the distance between two consecutive notches is between 0.5 and 2 times the thickness of the tape.

The width of the tape, i.e. the pitch of one turn when it is wound to form the tubular element, is less than 3 times the thickness of the tape and preferably, is between 0.5 and 1.5 times the tape thickness.

According to further embodiments, the notches can be made on parallel planes, orthogonal to the longitudinal extension of the tape and can penetrate into the tape itself in an oblique direction with respect to one of its surfaces. In an alternative, the notches can be placed on oblique planes with respect to the longitudinal extension of the tape.

According to a preferred embodiment, notches arranged on planes with different orientations and/or penetrating the tape according to different inclinations with respect to its surfaces, are present contemporaneously in pre-ordained sequences.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF PREFERRED EMBODIMENT

Figures 1, 2:
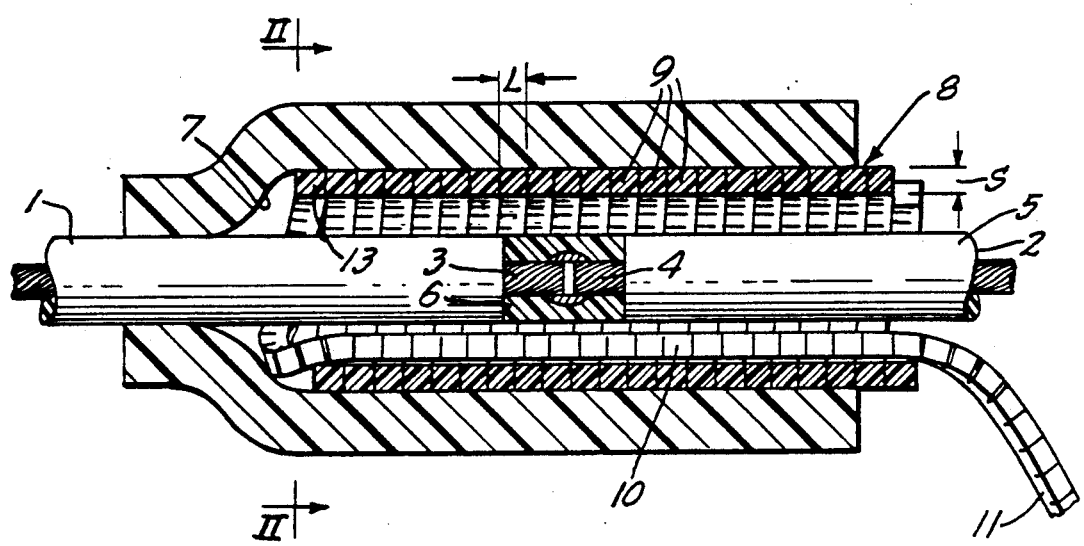
FIG. 1 shows, in a partial axial section, the zone of connection between two electric cables surrounded by a first embodiment of a sleeve and its supporting tubular body during the application of the sleeve.
FIG. 2 is a section of the embodiment shown in FIG. 1 and is taken along the line II-II indicated in FIG. 1.

As schematically shown in FIG. 1, two cable lengths 1 and 2 to be interconnected are arranged coaxially with their ends face-to-face, the conductor end portions 3 and 4 being bared, i.e. locally devoid of the insulation surrounding the same in order to carry out their electric connection.

Said electric connection is carried out with known means, such as by welding, clamps and the like, and therefore, a more detailed description thereof is not necessary.

The space corresponding to the portion of insulation which has been removed is then filled with a filler 6, also of a known type.

Moreover, at the connection area, there is arranged a sleeve 7, supported by a tubular body 8, in condition of high expansion, i.e. such as to make the inner diameter of the body sufficient for being slidingly fitted on one of the cable lengths to be connected, before the joining operation and then, to be slid over the connection itself and tightened on the exterior surfaces of the cables 1 and 2.

As is known, on the removal of the tubular body 8, the sleeve 7 can elastically contract, tightening on the insulating covering 5 of the conductors.

In order to be able to use the same sleeve for groups of cables of different diameters, the sleeve itself is formed with elastic characteristics and a diameter, when in its released position, which permit it to tightly engage the insulation of the smallest diameter cable of the group of cables for which it is designed and is expanded, on the tubular body 8, to a diameter which permits its insertion on the greatest diameter of the cables of the group. Such expansion corresponds to expansion values between 200% and 300% and provides radial stress on the tubular body 8 corresponding to pressures up to 1MPa or higher.

In order to permit an easy removal of the tubular body 8 after the completion of the joining of the conductors and the application of the sleeve itself in the desired position on the connection, the tubular body 8 is constituted by a plurality of turns 9 formed by a tape 10 of plastic material or the like, wound as a helix, the turns 9 being adjacent to each other and bonded to each other in a separable manner.

The bond between the turns 9 can be carried out by means of known techniques, such as spot welding, glueing, mutual engagement of complementary profiles, etc., suitable to permit the tearing of the bond itself with a manual pull effected on one side portion 11 which is inserted through the free space left for it between the tubular body 8 and the outer surface of the insulation of the cables 1 and 2. In said way, as the tape is pulled by the end portion 11 in the direction axially of the body 8 and revolved around such axis in the unwinding direction of the turns 9, the tubular body unwinds in the shape of a tape and moves away from the inside of the sleeve 7 which can therefore elastically tighten on the cables 1 and 2 as desired.

To provide the assembly of the sleeve 7 and the body 8, the tape 10 is helically wound with adjacent turns in abutting relation, for instance, with the help of a mandrel or similar supporting device.

The adjacent faces of the turns 9 are bonded to each other in any known manner, for example by glue, welding, spot welding, interengagement of complementary profiles or the like, during the winding of each turn or after the complete winding of the body 8.

The body 8 is then inserted in a sleeve 7, radially stretched, preferably with the help of a known apparatus, such as, for example, the apparatus disclosed in co-pending U.S. Pat. No. application 07/433,710 filed Nov. 8, 1989 and assigned to the assignee of this application.

To bear the outer pressure given by the radial expansion imposed on the sleeve 7, as indicated above, it is necessary that the tubular body 8 has a sufficiently great wall thickness S to prevent its collapse in consequence of the inward pressure thereon. However, the corresponding thickness could make the tape 10, if it has a constant section, have a very high bending stiffness which would impede the easy unwinding of it into rectilinear or substantially rectilinear shape from the space available between the remaining portion of the body 8, not yet unwound, and the cables 1 and 2 connected together.

Figure 3:
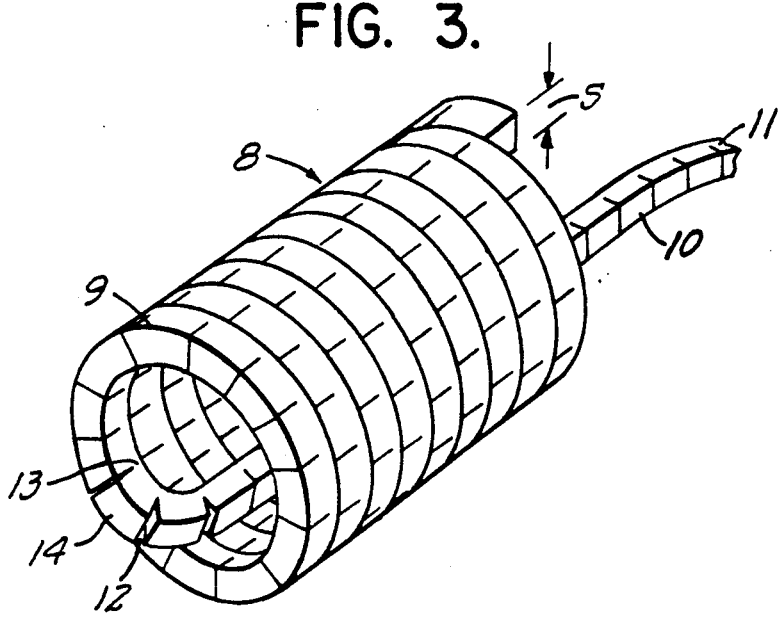
FIG. 3 is a perspective view of the supporting body for the sleeve during the unwinding step, the cables and the sleeve being omitted for a better illustration of the supporting body.

Since the requirements of resisting the outer pressure and of flexibility are in contrast with each other, the tape 10, the turns of which form the tubular body 8, is provided, as better shown in the FIGS. 2 and 3, with the transverse notches 12 which make it possible for the section of tape resistant to bending, in the direction tending to open the notches 12, to be considerably smaller than the section of the entire tape which reacts wholly to the outer pressure whereby the tape itself has the desired degree of flexibility without impairing its resistance to the pressure applied thereto by the sleeve 7.

In particular, in the embodiment shown in FIGS. 1 to 6, the notches 12 are made on the lateral face of the tape which comes into contact with the opposite face of the successive turn in the wound configuration and which faces toward the extremity of the body 10 opposite to the extremity of the tubular body from which the tape end 11 extends.

In this way, as shown in FIG. 3, the tape 10 bends, for inserting it in the wound part of the tubular body, the side provided with notches being maintained outside the formed curve so that said notches can open, making it easy to bend the tape itself.

In fact, the bending of the tape in said direction is borne, at the notches, only by the tape portion 13 lying behind the direction of the bending itself, which has a resistance to the bending in said direction, considerably lower than bending in the opposite direction, and the value of said resistance can be chosen according to the need by varying the depth of the notches 12.

Therefore, the tape 10 can be easily bent in a plane substantially tangent to the surfaces of the cables 1 and 2 and then, be inserted in the space between the cable surfaces and the tubular body 8 without suffering considerable torsions, and consequently requiring a free space between the cables and the tubular body only slightly greater than the thickness S of the tape.

This is particularly advantageous because it permits to keeping the expansion imposed on the sleeve 7 to a minimum thereby reducing all the problems connected therewith.

The depth of the notches 12, while convenient to be large for ensuring a high flexibility, has as a limitation a value which leaves a section in the zone 13 large enough to withstand the tensile stresses required by the unwinding of the tape.

Figure 4:
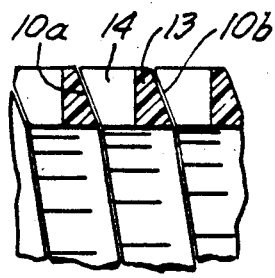
FIGS. 4, 5, 6 show, in fragmentary cross-section, three alternative embodiments of the tape forming the tubular body.

In order to avoid that the tape portions between two notches can be bent inside the tubular body 8, under the effect of the pressure applied by the sleeve 7 and hence, causing undesirable discontinuities on the outer surface of the tubular body 8 itself, the sides 10a and 10b of the tape which go into mutual contact in the wound position can be oblique, as illustrated in FIG. 4 which shows a portion of tubular body, sectioned at the notches of the tape 10, so that the portion 14 between two notches bears against the side, equally inclined, of the portion 13 lying behind the notches which withstands the bending.

Figure 5:
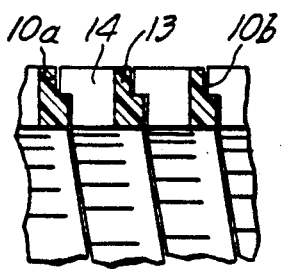
Figure 6:
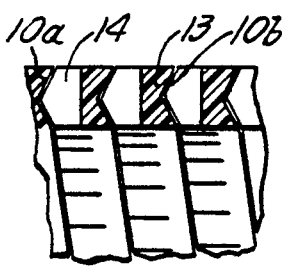

In an alternative, as shown in FIG. 5, the sides 10a, 10b of the tape 10 can be shaped in such a way as to form mating steps, or also, as shown in FIG. 6, it is possible to provide a symmetrical shaping of the sides 10a, 10b, for instance in the form of a V, so that the portion 14 between two successive notches is guided bilaterally by the portion 13 lying behind the notches, thus ensuring the complete continuity of the outer surface of the tubular body 8 and avoiding that the unevennesses of the sides originate impressions, more or less permanent, on the inner surface of the sleeve 7.

The faces defining the notches 12 are made to be in contact with one another when the tape is in rectilinear configuration or is helically wound. Therefore, in the wound configuration, the tape acts as a body without discontinuities, both in the continuous zone 13 and in the zone provided with notches 12.

In fact, the inward pressure produced by the expanded sleeve 7 corresponds to a compression stress in the whole section of the wall of the tubular body 8, and therefore, the presence of the notches 12 is not influential for the resistance.

The assembly according to the invention, comprising the tubular support 8 and the sleeve 7 fitted thereon, can be put on the market already prepared, i.e. with the tape partially unwound at one extremity of the tubular support and inserted into this latter far enough to extend out of the opposite extremity with its end, through which the pull for unwinding the turns of the support is exerted as previously described.

Figure 7:
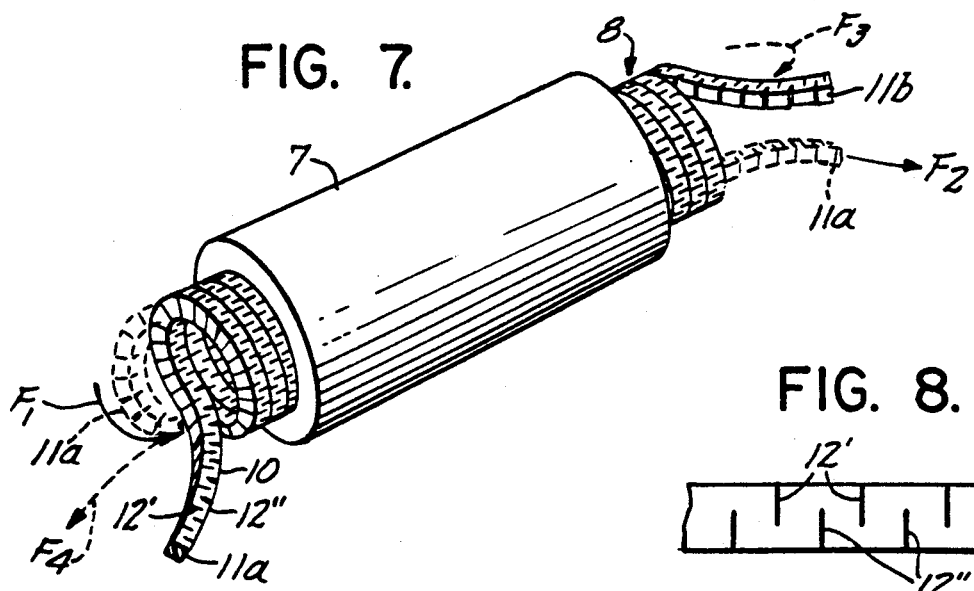
FIG. 7 is a perspective view of the assembly of a sleeve fitted on the supporting tubular body according to a further embodiment of the invention.
Figure 8:
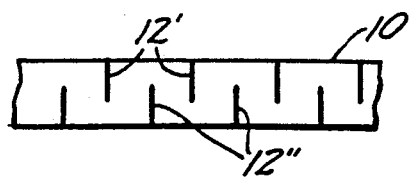
FIG. 8 is a fragmentary, cross-sectional view of the tape shown in FIG. 7.

In the case in which the assembly is provided instead with a fully wound tubular support 8, i.e. not previously unwound in part and prearranged as described, and in order to avoid that a user can begin to unwind the tape at the extremity opposite to intended one, thereby bending the tape 10 in a direction tending to close the notches 12 and making useless the presence of the notches 12, an alternative embodiment of the tape of the invention, as shown in FIGS. 7 and 8, has notches 12' and 12'' alternating on one and on the other of the lateral surfaces of the turns formed by said tape.

In this way, as shown in FIG. 8, the user can either begin to unwind the end 11a or the end 11b of the tape 10 for a certain portion and subsequently insert the unwound part into the bore of the tubular support and pull it out at the opposite extremity. For example, it is possible to unwind the end 11a and to insert it into the tubular support 8 in the direction of the arrow $F_1$, as shown with dashed line, and to pull it out at the opposite extremity of the tubular support 8, by means of a pulling action in the direction of the arrow $F_2$.

During said operation, the notches 12', stressed to become wider, facilitate the bending of the tape 10, while the notches 12" remain closed and their presence is not influential.

Likewise, it is possible to unwind the end 11b of the tape, insert it into the bore of the tubular support 8 and pull it out at the opposite extremity of the support 8 according to the dashed arrows $F_3$, $F_4$ with the aid of the notches 12".

In such a way, whatever the choice made by the user is, the tubular support could be removed in the same easy manner.

Figure 9:
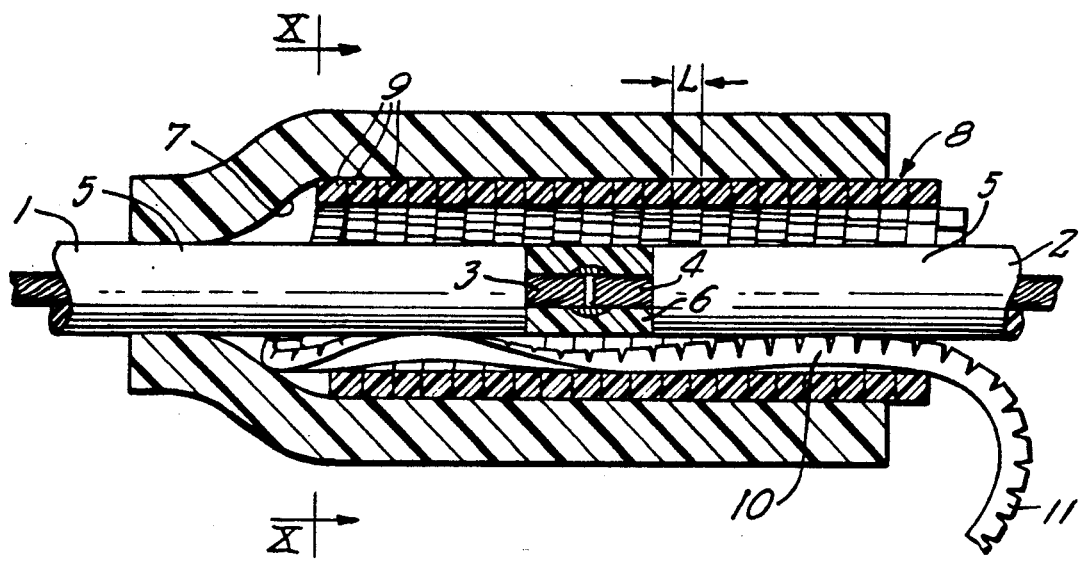
FIG. 9 is similar to FIG. 1 and shows, in partial axial section, the zone of connection of two electric cables surrounded by a sleeve with a supporting tubular body according to an alternative embodiment.
Figure 10:
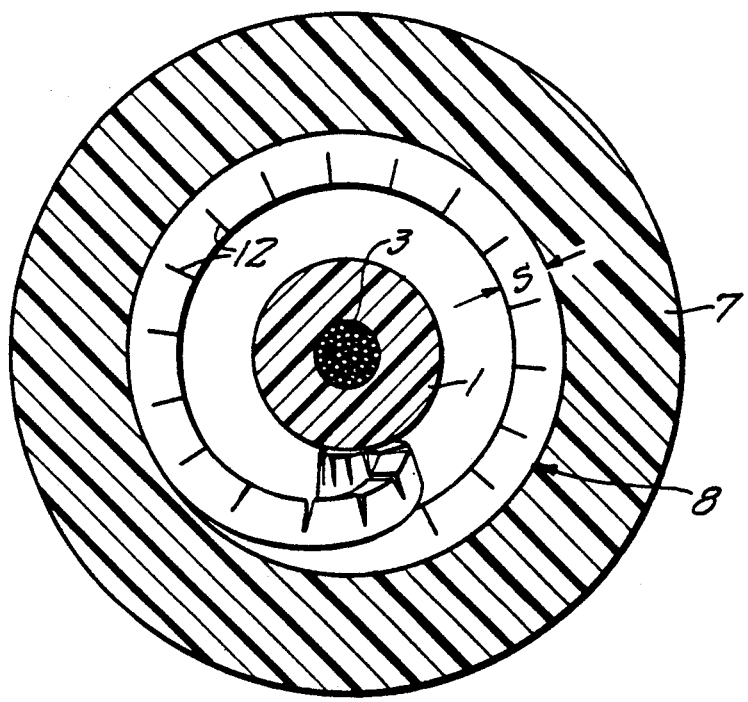
FIG. 10 is a section of the embodiment shown in FIG. 9 and is taken along line X—X indicated in FIG. 9.
Figure 11:
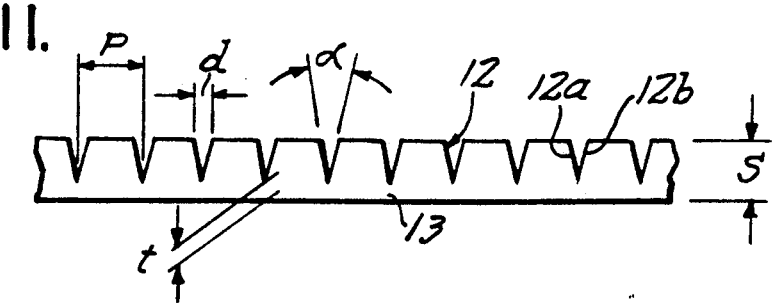
FIG. 11 shows the profile of the tape forming the tubular body in the embodiment of FIGS. 9 and 10, when it is unwound and in rectilinear configuration.

In a further alternative embodiment, as shown in FIGS. 9, 10 and 11, the notches 12 of the tape 10 can be made on the side of the tape intended to constitute, after the winding, the inner surface of the tubular body 8 formed by said tape.

In this case, said notches can have the faces 12a, 12b forming a dihedron when the tape is arranged in rectilinear configuration (see FIG. 11) which come into contact with each other when the tape is helically bent with the notches facing inwardly to form the turns 9 and are further pressed one against the other in consequence of the inward pressure applied by the sleeve 7.

In this condition, as in the preceding cases, the behavior of the so formed tubular body 8, under the effect of the inward pressure, is substantially equivalent to that given by a body without the notches 12. On the other hand, in presence of a pull along the tape 10 intending to bring it to the rectilinear configuration, undoing the tubular body 8, the faces 12a, 12b of the notches move away from each other and the flexural resistance and the torsional resistance of the tape are supplied only by the thickness t of the section 13 of the tape itself lying below the notch, permitting large deformability which meets the requirements of the invention.

To ensure the contact between the walls 12a, 12b once the tape is helically wound, the opening angle a of the notches 12 when the tape is in rectilinear position, shown in FIGS. 9 and 11, must be such as to give an opening value d of each notch equal to:

$$d < \frac{2\pi S}{n},$$

where S is the thickness of the tape, and consequently, of the wall of the tubular body 8, and n is the number of notches present in one turn so as to guarantee a tightly closed contact between the faces 12a, 12b and as much as possible, a continuous bending of the tape when it is wound to form the tubular body 8.

In this embodiment, during the unthreading in the space comprised between the tubular body 8 and the cables 1 and 2, the tape 10 suffers, particularly near the zone of its separation from the body 8, a torsion that causes it to twist in transverse direction in said space, as schematically shown in FIGS. 9 and 10. Therefore, in this case, it is necessary to provide a free space between the body 8 and the larger one of the cables for which the sleeve is used which permits said twisting, said space being equal to or greater than the diagonal dimension of the tape section.

In all the described embodiments, the pitch p between two consecutive notches, or between two consecutive notches made on the same surface, has to be such as to form at least eight notches for each turn but preferably a higher number of notches. In a preferred embodiment, the pitch p is between 0.5 and 2 times the thickness S.

The width L of the tape i.e. the pitch of one turn is chosen to be not higher than 3 times the thickness of the tape and is, preferably, between 0.5 and 1.5 times the thickness S.

The greater values of said width can be used for tapes having notches according to the embodiments of FIG. 1 or FIG. 7, while with notches according to FIG. 9, since torsions can occur during the unwinding, it is preferred that the width values are lower.

By way of example, a tubular body 8 having an outer radius r=25 mm suitable for withstanding an inward pressure up to 0.7 MPa, can be made starting with a tape of polypropylene having a modulus of elasticity E=1500 MPa, a thickness S=3 mm and a width L=3 mm. The pitch between the notches can be chosen, in both the above described embodiments of notches, equal to p=5 mm, owing to the relative flexibility of the material used.

The indicated pressure value, for example, can correspond to a sleeve of the type described in said U.S. application Ser. No. 07/464,370 previously cited with an inner diameter, before stretching, equal to 17 mm and wall thickness, in the same condition, of 15 mm, and which is expanded up to an inner diameter of 51 mm, i.e. an expansion of 200%.

In order to withstand higher pressures, for example 0.9 MPa, corresponding to more rigid sleeves and having a greater thickness and subjected to stronger expansions, it is possible to use, for instance, a tape of polyamide resin with a modulus of elasticity E=3000 MPa, with the same thickness and width as the preceeding example and with an outer radius r=34 mm when wound. Owing to the greater rigidity of the material in this case, a pitch between the notches of p=3 mm is preferred.

For example, this second body can be used with a sleeve of the same type as that described in the previous case, i.e. with an unexpanded inner diameter of 17 mm and thickness of 15 mm which is expanded up to an inner diameter of 68 mm, i.e. an expansion of 300%.

For some embodiments, for instance, in the case of particularly rigid tapes, it is possible to provide notches in both the directions described hereinbefore, i.e. both on the inner surface and on the flank of each turn, or also notches engraving the tape in the plane transverse to its greater direction with an oblique direction with respect to its faces, or also in an oblique plane with respect to the longitudinal extension of the tape.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An assembly of an elastic sleeve with a tubular supporting body in the bore of said sleeve for application of said sleeve to a cylindrical body, said assembly comprising:

a radially stretched sleeve of elastic material; and said tubular supporting body formed by a helically wound tape with contiguous turns with outer surfaces forming an outer surface of said supporting body and with other surfaces radially inwardly of said outer surfaces, said supporting body having an outer surface diameter greater than the inner diameter of the bore of said sleeve in the unstretched state of said sleeve and being disposed within said bore of said sleeve, said supporting body having a radial resistance to the pressure applied thereto by the stretched sleeve sufficient to maintain said sleeve in its stretched state and said tape having along substantially its entire length a plurality of spaced notches extending transversely to the length of said tape, and with said tape helically wound to form said supporting body, said notches extend from at least one of said other surfaces of said turns in the direction toward another of said surfaces but having a depth dimension in said direction less than the distance between said one of said other surfaces and said another of said surfaces in said direction to provide a continuous portion of the tape extending lengthwise of the tape and said notches are defined by facing and contacting but separable walls whereby said tape may be bent relatively easily along a curved path in a plane parallel to a plane tangent to the surface of said cylindrical body and may be removed from said sleeve by pulling said tape out of said bore to permit said sleeve to contract around a cylindrical body.

2. An assembly as set forth in claim 1 wherein an end portion of said tape extends within said body from one end thereof and out of the other end thereof.

3. An assembly as set forth in claim 2 wherein said notches open toward said one end of said body.

4. An assembly as set forth in claim 3 wherein the number of notches per turn is greater than eight.

5. An assembly as set forth in claim 1 wherein said tape has two groups of notches, one group of which opens toward one end of said body and the other group of which opens toward the other end of said body.

6. An assembly as set forth in claim 5 wherein the number of notches in each group is greater than eight and that the notches in one of said groups are circumferentially staggered with respect to the notches in the other of said groups.

7. An assembly as set forth in claim 1 wherein said walls are bonded to each other.

8. An assembly as set forth in claim 7 wherein the bond between said walls is breakable by the pulling force applied to said tape upon removal thereof from the interior of said sleeve.

9. An assembly as set forth in claim 1 wherein the depth of such notches is such that the remaining portions of said tape have a strength sufficient to withstand the pulling force applied to said tape upon removal thereof from the interior of said sleeve.

10. An assembly as set forth in claim 1 wherein the opposed faces of the contiguous turns have complementary, interengaging shapes.

11. An assembly as set forth in claim 10 wherein at least part of one of said faces is intermediate the notches in said one of said faces.

12. An assembly as set forth in claim 10 wherein one of said faces is convex and the other of said faces is concave in a section taken axially of said body.

13. An assembly as set forth in claim 10 wherein one of said faces is stepped and the other of said faces is stepped so as to mate with said one of said faces.

14. An assembly as set forth in claim 10 wherein one of said faces extends at an acute angle to a plane at right angles to the axis of said body and the other of said faces extends at a complementary angle.

15. An assembly as set forth in claim 1 wherein said notches open toward the axis of said body.

16. An assembly as set forth in claim 15 wherein said notches are V-shaped with said tape extending rectilinearly and said walls interengage with said tape helically wound.

17. An assembly as set forth in claim 15 wherein the axial width of said tape is less than three times the radial thickness of said tape.

18. An assembly as set forth in claim 17 wherein the axial width of said tape is from 0.5 to 1.5 times the radial thickness of said tape.

19. An assembly as set forth in claim 1 wherein the number of notches per turn is greater than eight and the circumferential distance between successive notches is from 0.5 to two times the radial thickness of said tape.

20. An assembly as set forth in claim 1 wherein said walls are substantially parallel with said tape in rectilinear condition and extend at an oblique angle to a surface of said tape with said tape helically wound.

21. An assembly as set forth in claim 1 wherein said walls extend at an oblique angle to a surface of said tape with said tape in rectilinear condition.

22. An assembly as set forth in claim 1 wherein the cylindrical body is an electric cable, wherein said assembly surrounds said cylindrical body and wherein the inner diameter of said tubular supporting body is greater than the outside diameter of said cable by an amount at least equal to the radial thickness of said tape.

23. An assembly as set forth in claim 22 wherein said end portion of said tape is intermediate said cable and said tubular supporting body.

* * * * *